(12) United States Patent
Tani et al.

(10) Patent No.: US 8,322,479 B2
(45) Date of Patent: Dec. 4, 2012

(54) COVERING FOR MOTORCYCLE EXHAUST TUBE

(75) Inventors: Yoshiaki Tani, Kobe (JP); Hisayoshi Shibata, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 12/938,242

(22) Filed: Nov. 2, 2010

(65) Prior Publication Data

US 2011/0101643 A1　　May 5, 2011

(30) Foreign Application Priority Data

Nov. 4, 2009　　(JP) .................................. 2009-252926

(51) Int. Cl.
*B62J 23/00*　　(2006.01)
(52) U.S. Cl. .............. 180/219; 60/276; 60/299; 60/324; 181/227
(58) Field of Classification Search .................. 180/219; 60/276, 299, 324; 181/227; 280/304.3
See application file for complete search history.

(56) References Cited

U.S. PATENT DOCUMENTS

| 5,908,079 A * | 6/1999 | Amino ......................... 180/219 |
| 2005/0217629 A1 * | 10/2005 | Thurm et al. ............. 123/195 C |
| 2007/0145227 A1 * | 6/2007 | Hasegawa ..................... 248/637 |
| 2008/0110155 A1 * | 5/2008 | Harada ........................... 60/276 |

FOREIGN PATENT DOCUMENTS

JP　　2005-090237　　4/2005

* cited by examiner

*Primary Examiner* — Lesley D Morris
*Assistant Examiner* — Jacob Knutson (57) ABSTRACT

A covering for a motorcycle exhaust tube is employed in a V-banked combustion engine having a drive output shaft, extending in a direction widthwise of a motorcycle body structure, and front and rear cylinder units arranged one after another in a direction longitudinally thereof, the front cylinder unit being displaced in one sidewise direction relative to a longitudinal mid-center line of the motorcycle body structure. The covering includes a covering body for covering a front exhaust tube, which is drawn from the front cylinder unit in a direction opposite to the one sidewise direction and extends rearwardly downwardly, and a covering extension provided in the covering body and positioned rearwardly of a radiator so as to extend towards the front cylinder unit.

10 Claims, 6 Drawing Sheets

COVERING FOR MOTORCYCLE EXHAUST TUBE

CROSS REFERENCE TO THE RELATED APPLICATIONS

This application is based on and claims Convention priority to Japanese patent application No. 2009-252926, filed Nov. 4, 2009, the entire disclosure of which is herein incorporated by reference as a part of this application.

BACKGROUND OF THE INVENTION

1. Field of the Invention

The present invention relates to an exhaust tube shroud for a motorcycle exhaust system of a V-shaped combustion engine mounted on a motorcycle.

2. Description of the Prior Art

In a motorcycle having mounted thereon a so-called V-twin combustion engine of a type, in which two cylinder units are arranged one behind the other in a direction longitudinally of the motorcycle body structure, a radiator is generally provided forwardly of the combustion engine with respect to the direction of forward travel of the motorcycle and a radiator fan is positioned rearwardly of the radiator. Engine cylinder units of the V-twin combustion engine are offset relative to each other in a direction widthwise of the motorcycle body structure, and exhaust tubes are drawn from those engine cylinder units, respectively, in a direction rearwardly of the motorcycle body structure. In order to protect motorcycle rider's feet from high temperature heat emanating from the exhaust tubes, and also, to enhance the appealing feature to the motorcycle appearance, each of those exhaust tubes is provided with a protective covering such as disclosed in, for example, the JP Laid-open Patent Publication No. 2005-90237, published Apr. 7, 2005.

It has, however, been found that where in the motorcycle of such a type as referred to above, the front cylinder unit is offset laterally on one side, for example, leftwards with respect to the direction of forward travel of the motorcycle and the exhaust tube from such cylinder unit is drawn on one side opposite to the direction of offset, that is, rightwards, a hot air stream flowing across the radiator, drawn particularly by the radiator fan, tends to flow through a space delimited between the front cylinder unit, which has been offset, and the exhaust tube drawn from the front cylinder unit and is eventually blown off towards the rider's right leg and, therefore, particularly during the summer season, the rider will feel discomfort driving the motorcycle.

SUMMARY OF THE INVENTION

In view of the foregoing, the present invention has been devised to provide an exhaust tube covering of a type effective to prevent the hot air, then flowing across the radiator, from blowing onto the rider.

In order to accomplish the foregoing object, the present invention provides a covering for a motorcycle exhaust tube employed in a V-banked combustion engine having a drive output shaft, extending in a direction widthwise of a motorcycle body structure, and a plurality of cylinder units arranged one after another in a direction longitudinally thereof, the cylinder units including a front cylinder unit that is displaced in one sidewise direction relative to a longitudinal mid-center line of the motorcycle body structure. The exhaust tube covering includes a covering body for covering a front exhaust tube, which is drawn from the front cylinder unit in a direction opposite to the one sidewise direction and extends rearwardly downwardly, and a covering extension provided in the covering body and positioned rearwardly of a radiator so as to extend towards the front cylinder unit. The covering extension referred to above does preferably close a space delimited between the front exhaust tube and the front cylinder unit.

It is to be noted that in the description of the present invention set forth hereinabove and hereinafter, the term "cylinder unit" is to be construed as including a cylinder block, a cylinder head mounted atop the cylinder block, and a cylinder head cover mounted atop the cylinder block so as to enclose the cylinder head together with any known fuel intake and exhaust valve mechanisms.

According to the present invention, a stream of hot air W across the radiator flows in much quantity towards the side opposite to the side to which the cylinder unit is displaced, but the present invention allows the covering extension, positioned rearwardly of the radiator, to prevent the hot air across the radiator from impinging upon a motorcycle rider. In addition, the covering extension is provided in an exhaust tube covering body and, therefore, the number of component parts employed does not increase.

The covering extension referred to above preferably has an opening defined therein. By way of example, this opening is a gap defined between a lower end portion of the covering extension and a body of the combustion engine. The term "body of the combustion engine", or "engine body", is to be construed as including an engine casing, inclusive of a crankcase and a transmission gear box, and the cylinder units. The use of the opening in the covering extension is effective to allow the hot air, blocked by the covering extension, to be guided in a direction rearwardly of the motorcycle body structure through the opening and, therefore, the hot air can be discharged rearwardly of the motorcycle body structure while preventing the hot air from impinging on the motorcycle rider and also avoiding an undesirable stagnation of the hot air flowing across the radiator.

In a preferred embodiment of the present invention, a casing shroud may be fitted to a body of the combustion engine so as to protrude laterally outwardly from front and rear cylinder units, in which case an upper end of the opening is defined in the covering extension at a location above at least a front portion of the casing shroud. According to this feature, the hot air flowing across the radiator can be guided rearwardly past an area above the casing shroud protruding laterally and, therefore, the flow of the hot air having past the opening will not be disturbed by the presence of the casing shroud.

In another preferred embodiment of the present invention, an air cleaner shroud is fitted to the body of the combustion engine and positioned intermediate between front and rear cylinder units so as to protrude laterally outwardly from those cylinder units, in which case the opening has a lower end portion positioned below the air cleaner shroud. According to this structural feature, the hot air then flowing across the radiator can be guided rearwardly past an area below the air cleaner shroud protruding laterally and, therefore, the flow of the hot air past the opening will not be disturbed by the air cleaner shroud.

In a further preferred embodiment of the present invention, the front exhaust tube is made up of, for example, an upstream portion, drawn in the one sidewise direction and bent to extend rearwardly downwardly, and a descending portion continued from the upstream portion so as to extend rearwardly downwardly, in which case the covering extension is formed in an upper portion of the covering body so as to close a space below the upstream portion of the front exhaust tube. This structural feature allows a lateral space present between the front cylinder unit and the front exhaust tube drawn in the opposite direction to be closed by the covering extension.

Preferably, the combustion engine employed in the practice of the present invention may be a two cylinder combustion engine including a front cylinder unit and a rear cylinder unit, the front cylinder unit being displaced leftwards relative to a longitudinal mid-center line of the motorcycle body structure and the rear cylinder unit is displaced rightwards relative thereto.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A preferred embodiment of the present invention will now be described with reference to the accompanying drawings. It is, however, to be noted that in the description that follows, the terms "left" and "right" employed here in this specification are to be construed as descriptive of respective directions as viewed by a rider of the specific motorcycle then traveling in a forward direction.

Figure 1:
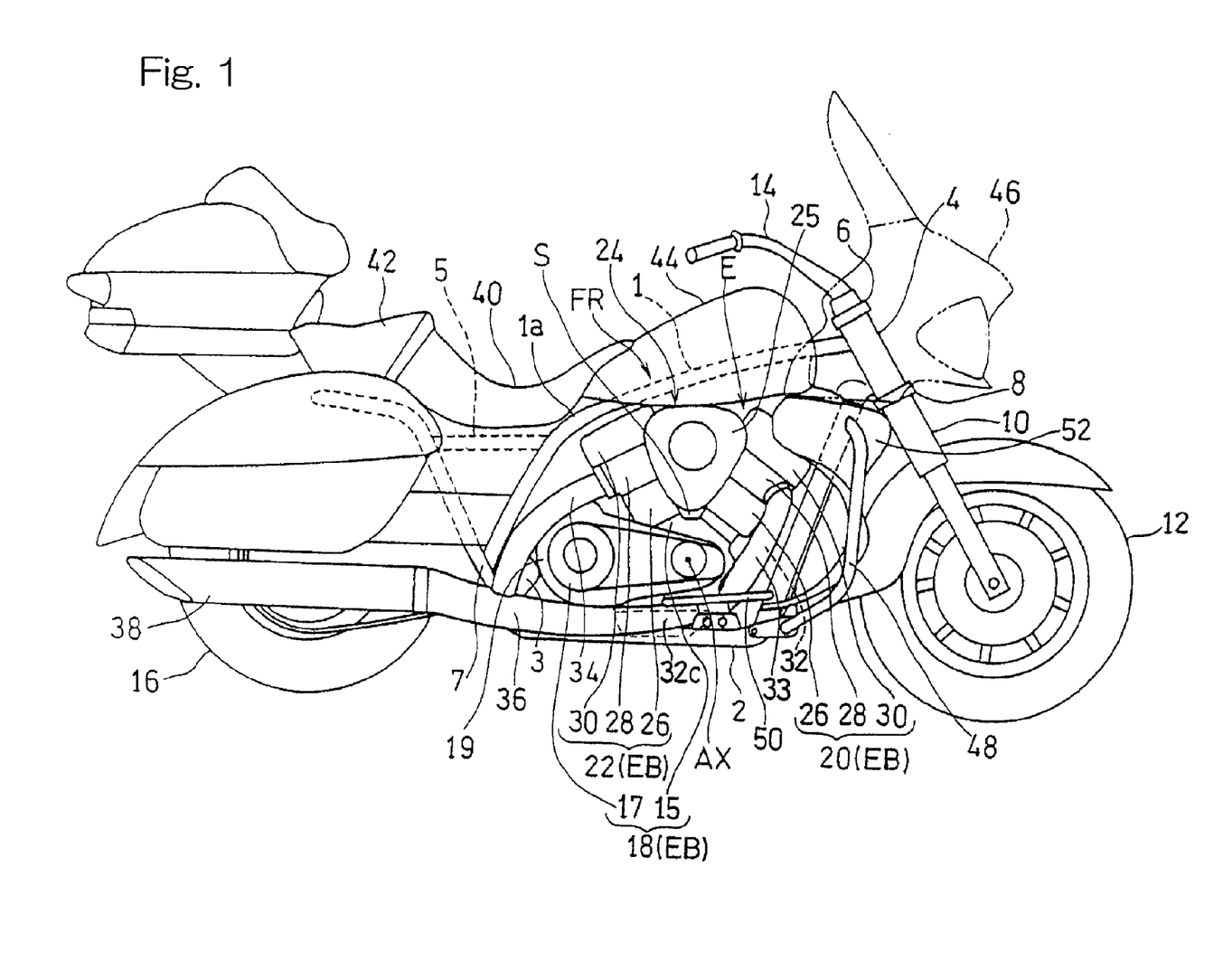
FIG. 1 is a schematic side view of a motorcycle equipped with an exhaust tube covering according to a preferred embodiment of the present invention.

FIG. 1 illustrates a schematic side view of a cruiser type motorcycle equipped with an exhaust tube covering designed in accordance with the preferred embodiment of the present invention. The motorcycle shown therein includes a main frame member 1 and a pair of down tubes 2, both cooperating with each other to define a front frame assembly of the motorcycle frame structure FR. A head tube 4 is secured to a front end of the main frame member 1 and a front junction of the pair of the down tubes 2, and an upper bracket 6 and a lower bracket 8 are supported through a steering shaft (not shown), which is rotatably inserted into the head tube 4, for rotation together with the steering shaft. A front fork assembly 10 has their upper end portion supported by the upper and lower brackets 6 and 8 and also has lower end portion that supports a front tired wheel 12 rotatably. A handlebar 14 is fixedly mounted on the upper bracket 6 that is secured to the upper end of the front fork assembly 10 so as to extend generally perpendicular to the steering shaft.

The main frame member 1 is curved as at 1a to extend downwards so as to terminate at a swingarm bracket 3. A pair of left and right seat rails 5 rigidly connected to a curved area 1a of the main frame member 1 so as to extend therefrom in a direction rearwardly of the motorcycle. Respective rear halves of the down tubes 2 referred to above form left and right tubular reinforcement members 7 that extend rearwardly and upwardly of the swingarm bracket 3 before they are rigidly connected with the left and right seat rails 5. Those seat rails 5 and reinforcement members 7 altogether form a rear frame assembly of the motorcycle frame structure FR.

A V-banked, two-cylinder combustion engine E, which forms a power source of the motorcycle, is supported in part by the main frame member 1 and in part by the down tubes 2 in any known manner. The combustion engine E has a longitudinal axis AX represented by the axis of rotation of a drive output shaft (a crankshaft) and is drivingly coupled with a rear tired wheel 16 by means of a drive transmission element such as, for example, a substantially endless belt or chain (not shown) for driving the rear tired wheel 16.

The motorcycle combustion engine E has an engine casing 18 including a crankcase 16, positioned therebelow, and a transmission gear box 17 positioned rearwardly thereof. A forwardly tilted cylinder unit 20 and a rearwardly tilted cylinder unit 22 are arranged on top of the crankcase 15 one after another in a direction longitudinally of the motorcycle. The front cylinder unit 20 has its longitudinal axis tilted forwardly an angle of, for example, about 52° from a horizontal direction about the longitudinal axis AX of the combustion engine E whereas the rear cylinder unit 22 has its longitudinal axis tilted rearwardly an angle of, for example, about 52°, with a generally V-shaped interbank space S defined between front and rear banks, in which the front and rear cylinder units 20 and 22 are defined respectively. This V-shaped interbank space S accommodates therein an air cleaner 24.

Each of the cylinder units 20 and 22 includes a cylinder block 26, connected to the crankcase 15, a cylinder head 28 connected to top thereof, and a head cover 30 mounted on the respective cylinder head 28 so as to cover the latter. Opposite lateral portions of the engine casing 18 and those of the air cleaner 24 are covered by a casing shroud 19 and an air cleaner shroud 25. Although the casing shroud 19 on the right side of the engine casing 18 is of one piece structure of a size enough to cover a lateral portion of the crankcase 15 accommodating therein a clutch, a transmission and a power generator, separate shroud members (i.e., a clutch shroud, a transmission shroud and a generator shroud) may be employed for covering the clutch, the transmission and the power generator, respectively, in which case one of those shroud members may serves as the casing shroud referred to above. Each of the cylinder blocks 26 has a reciprocating piston (not shown) accommodated therein for sliding movement in a direction parallel to the longitudinal axis of the corresponding cylinder unit. Also, a cam chain casing may be enclosed in the cylinder blocks 26. The engine casing 18, the cylinder blocks 26, the cylinder heads 28 and the head coverings 30 altogether constitute an engine body EB of the motorcycle combustion engine E.

Also, the front and rear cylinder units 20 and 22 of the motorcycle combustion engine E are fluid connected with front and rear exhaust tubes 32 and 34, which are drawn rightwards from the associated cylinder heads 28 so as to extend in a direction rearwardly downwardly. The front exhaust tube 32 extends from a front side of a front portion 19a of the casing shroud 19 in a direction substantially horizontally rearwardly past a lower region of the casing shroud 19 whereas the rear exhaust tube 34 extends downwardly while being curved so as to protrude rearwardly. The front and rear exhaust tubes 32 and 34 have their downstream ends fluid connected together by a collecting tube 36 positioned on the right hand of the motorcycle body structure, and left and right silencers 38 positioned on respective sides of the rear tired wheel 16 are arranged having been ramified from the collecting tube 36. Each of the front and rear exhaust tubes 32 and 34 are covered by a front or rear tube shroud (covering) 33 or 35 made of a metallic material.

It is to be noted that although reference has been made to the use of the two, that is, left and right silencers 38, the present invention may not be necessarily limited thereto. For example, only one silencer or a plurality of silencers may be employed and positioned on one side, for example, right side of the motorcycle body structure.

A rider's seat assembly having a driver's seat 40 for a motorcycle driver and a rear occupant's seat 42 for a fellow passenger both defined therein are mounted on the seat rails 5. A fuel tank 44 is mounted on an upper portion of the main frame member 1, that is, a top portion of the motorcycle body structure and positioned generally intermediate between the handlebar 14 and the driver's seat 40. Also, a front fairing 46 made of a synthetic resin is mounted on a front portion of the motorcycle body structure so as to cover a region encompassing forwardly of the handlebar 14 and an upper lateral area of that front portion on each side of the motorcycle body structure.

It is, however, to be noted that a motorcycle having no fairing is also available in the market and, therefore, the use of the front fairing is not always necessary in the motorcycle to which the present invention is applied.

Engine guards 48 for protecting the motorcycle combustion engine E are positioned on respective sides of the motorcycle body structure and below the front fairing 46 and are supported by generally vertically extending front halves of the respective down tubes 2. Those engine guards 48 are employed for the purpose of avoiding a possible direct contact of the combustion engine E with the ground surface in the event that the motorcycle falls sideways and are in the form of tubular members each protruding outwardly from the respective down tube 2 so as to overhang the associated side of the combustion engine E. Substantially horizontally extending rear halves of the down tubes 2 are provided with left and right foot rests 50. Left and right leg shields 52 for covering respective legs of the motorcycle driver are positioned forwardly of the associated foot rests 50 and are fitted to the corresponding down tubes 2 through the adjacent engine guards 48.

Figure 2:
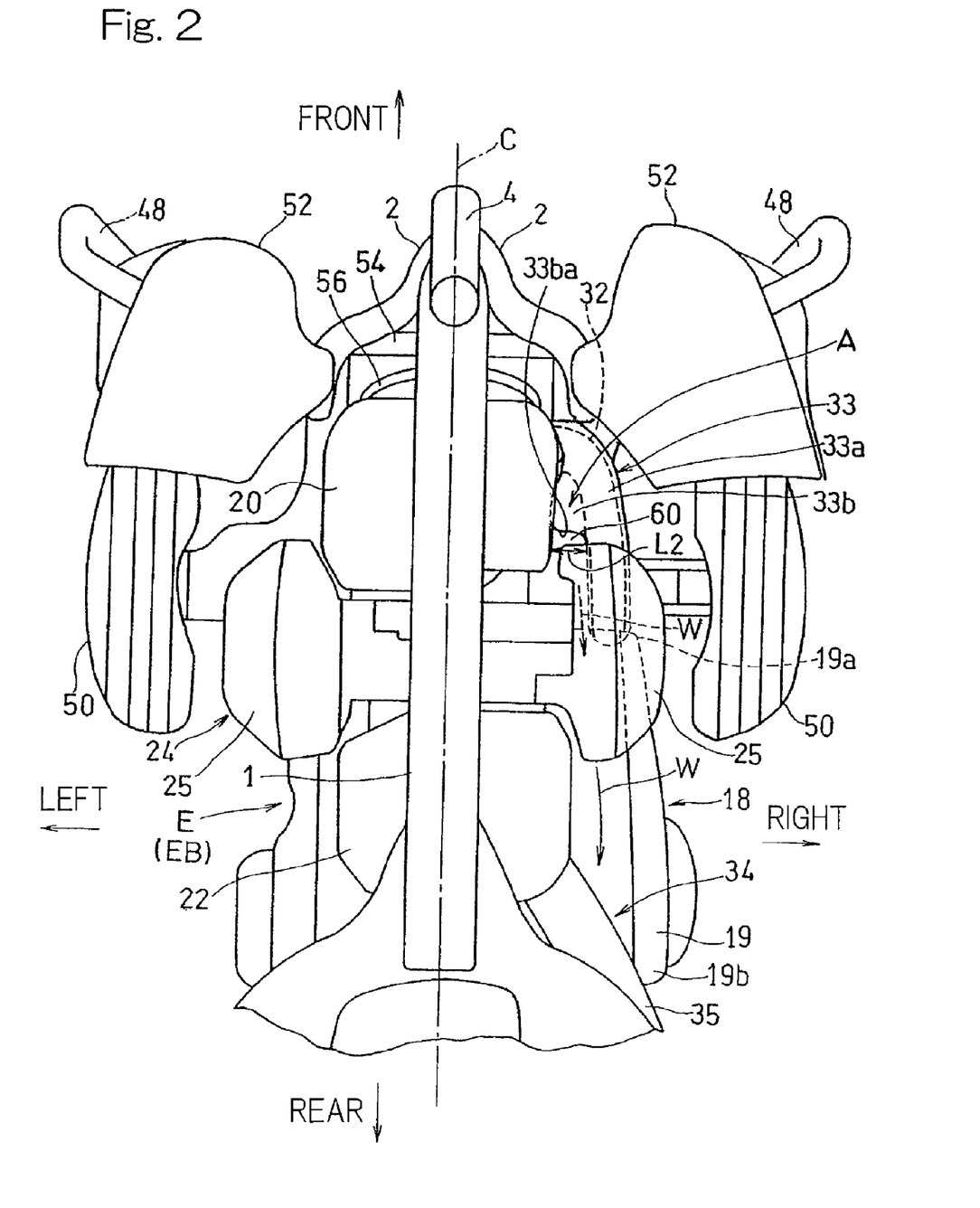
FIG. 2 is a fragmentary top plan view of the motorcycle, showing a motorcycle combustion engine and its surroundings.

As best shown in FIG. 2 showing a schematic top plan view showing a portion of the motorcycle of FIG. 1 on an enlarged scale, a radiator 54 for dissipating heat evolved in an engine cooling water used to cool the combustion engine E is positioned forwardly of the combustion engine E and arranged intermediate between the left and right leg shields 52 and 52, having been fixedly supported by the left and right down tubes 2 and 2. A radiator fan 56 for creating a forced draft of air flowing across the radiator 54 is attached rearwardly of the radiator 54. The radiator 54 and the radiator fan 56 are positioned on the longitudinal mid-center line C of the motorcycle body structure.

The front cylinder unit 20 is displaced on one side, for example, leftwards of the longitudinal mid-center line C of the motorcycle body structure whereas the rear cylinder unit 22 is displaced on the opposite side, that is, rightwards of the longitudinal mid-center line C. The casing shroud 19 and the air cleaner shroud 25 both referred to above are so designed and so configured as to protrude rightwards beyond the front and rear cylinder units 20 and 22. A side space A is defined intermediate between the front cylinder unit 20 and the front exhaust tube 32 and accordingly, when the radiator fan 56 is driven as a result of the combustion engine E having been started during the stoppage of the motorcycle, a stream of hot air W induced by the radiator fan 56 flown across the radiator flows towards the side space A. Also, during the travel of the motorcycle, an incoming wind (hot air W) then flowing across the radiator 54 to cool the later flows similarly towards the side space A. In other words, the stream of the hot air W is apt to flow in a much quantity in the rightward direction since the front cylinder unit 20 is displaced leftwards as hereinbefore described. As a result thereof, a much quantity of hot air W flows into the side space A.

The front tube shroud or covering 33 referred to previously includes a covering body 33a for covering a portion of an outer surface of the front exhaust tube 32, and the covering body 33a is formed integrally with a covering extension 33b so as to extend in a direction towards the front cylinder unit 20 to thereby close the side space A.

Figure 3:
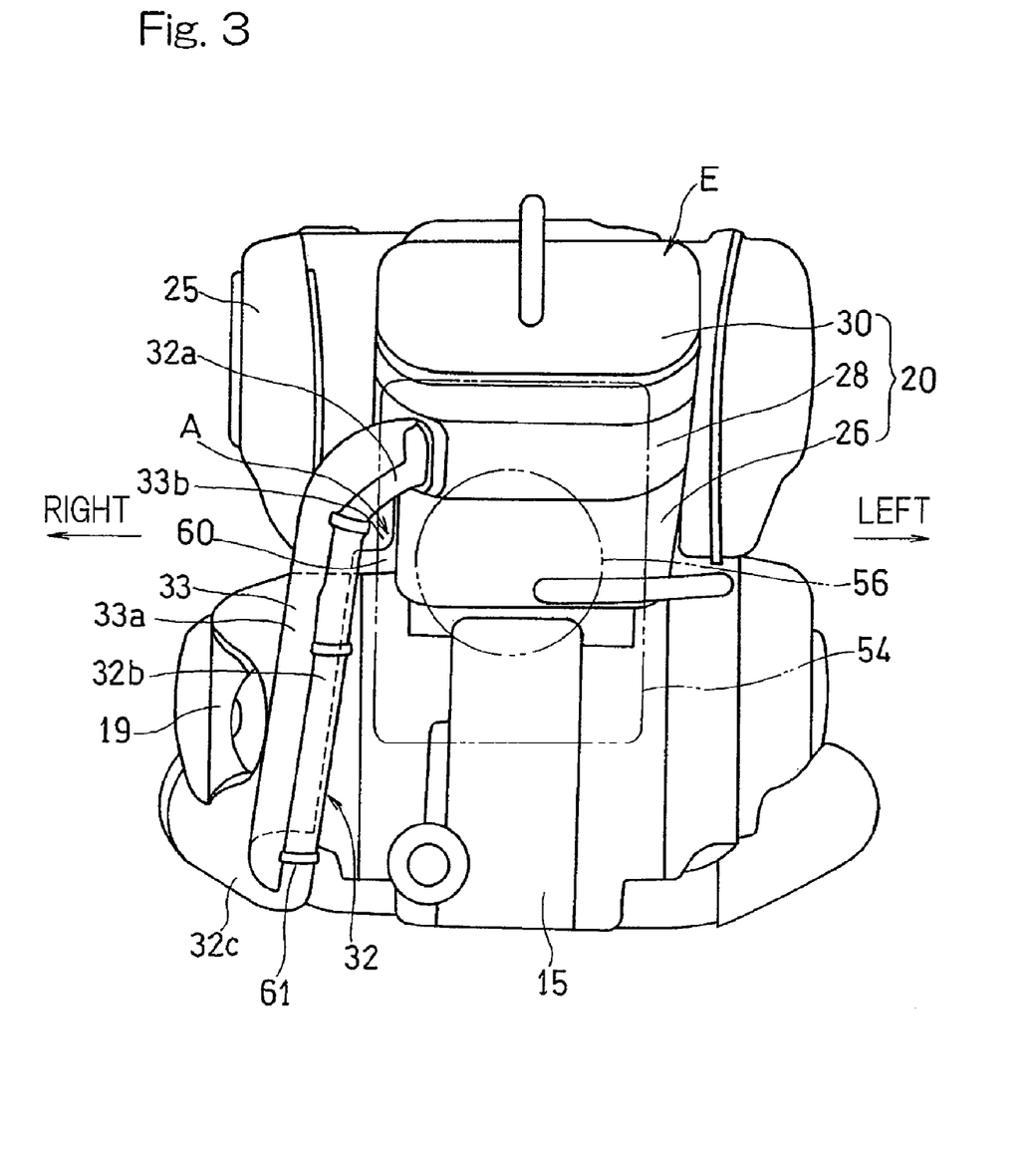
FIG. 3 is a fragmentary front elevational view, showing the motorcycle combustion engine and its surroundings.

As best shown in a schematic front elevational view of FIG. 3, illustrating the combustion engine E as viewed from front, the front exhaust tube 32 is made up of an upstream tube portion 32a that is drawn rightwards (in the opposite direction) from the cylinder block 26 and is then bent to extend in a direction rearwardly downwards of the motorcycle body structure, a descending portion 32b extending from that upstream portion 32a in a similar direction rearwardly downwards of the motorcycle body structure, and a downstream portion 32c extending from the descending portion 32b in a direction substantially horizontally rearwards. The front tube shroud 33 is so positioned as to cover a region of the upstream portion 32a of the front exhaust tube 32 encompassing an upper surface of such upstream portion 32a to an outer side surface thereof and, also, a region of the descending portion 32b encompassing an outer side surface of a major portion thereof including an upstream region. With the front tube shroud 33 so positioned as described above, the legs of the motorcycle driver are protected from hot air emanating from the front exhaust tube 32.

The covering extension 33b integral with the covering body 33a as hereinbefore described extends from an upper portion of the front tube shroud 33 and is positioned substantially horizontally rearwardly of the radiator 54 to thereby close the side space A below the upstream portion 32a of the front exhaust tube 32. An opening 60 in the form of a gap is defined between a rear end, that is, a lower end 33ba of the extension 33b and the engine body EB for discharging the hot air W within the side space A in a rearward direction. This opening 60 is also positioned substantially horizontally rearwardly of the radiator 54.

It is eventually to be noted that although in the illustrated embodiment the opening 60 has been shown and described as employed in the form of a gap, it may be in the form of a plurality of perforations defined in the front tube shroud 33 or in the form of a louver formed in the front tube shroud 33.

Figure 4A:
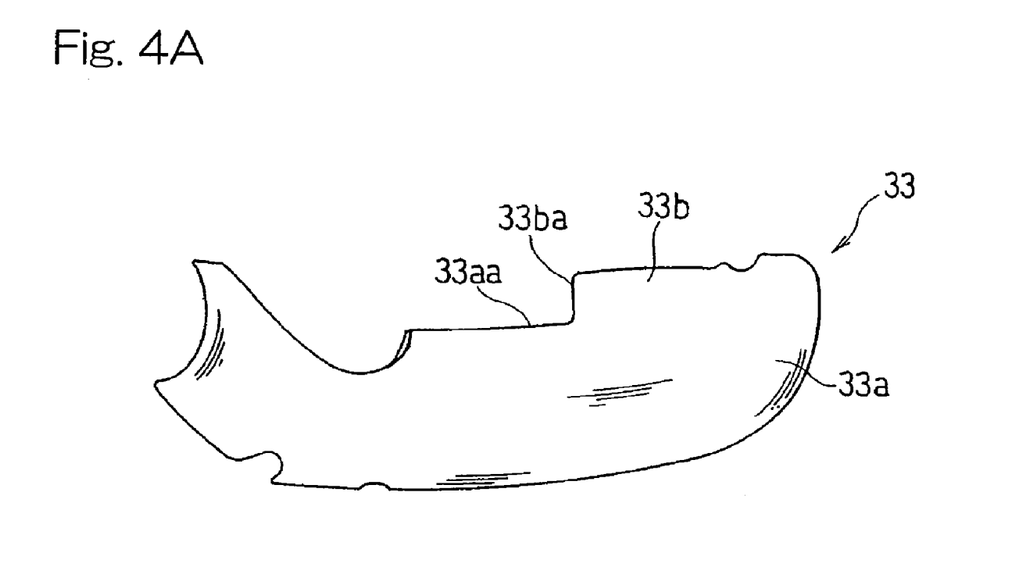
FIG. 4A is a perspective view of the exhaust tube covering, showing the appearance thereof.
Figure 4B:
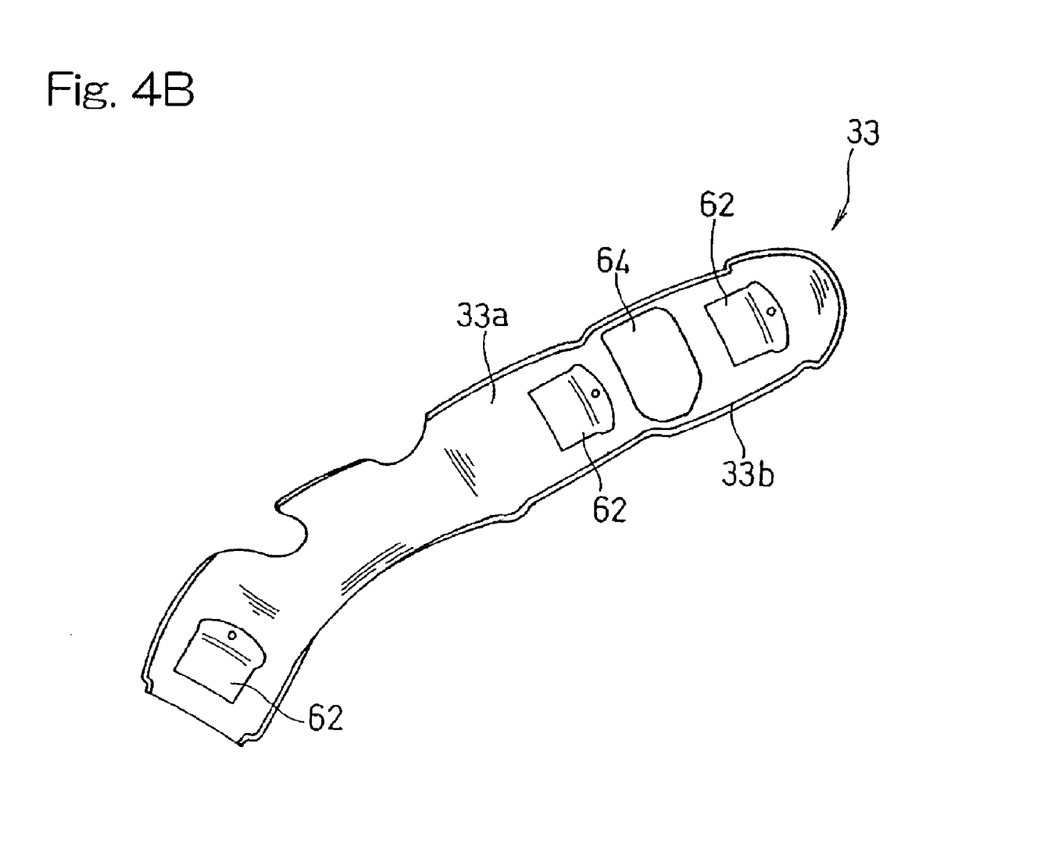
FIG. 4B is a view similar to FIG. 4A, showing an inner surface of the exhaust tube covering.

The details of the front tube shroud 33 are best shown in FIGS. 4A and 4B. Specifically as shown in FIG. 4A, the front tube shroud 33 is prepared by cutting, for example, a sheet metal to a desired shape, followed by bending it to assume the final shape and has an outwardly exposed outer surface that is finished with plating to improve an appealing appearance.

On the other hand, as best shown in FIG. 4B, the front tube shroud 33 has an inner surface opposite to the outwardly exposed outer surface referred to above, which inner surface has three support brackets 62 rigidly secured thereto so that the front tube shroud 33 can be secured to the front exhaust tube 32 through those brackets 62. Although in the illustrated embodiments the support brackets 62 are secured to front, rear and intermediate portions of the inner surface of the front tube shroud 33, the number of the support brackets used and the positions of the front tube shroud 33, where they are secured, may not necessarily be limited to those described above.

The front tube shroud 33 referred to above is fitted to and, hence, supported by the front exhaust tube 32 by fitting a support band 61 of ring shape shown in FIG. 3 to each of the support brackets 62 and, then, fastening the respective support band by means of a corresponding fastening member (not shown) such as, for example, a bolt after the front exhaust tube 32 has been passed through the respective support band 61. As shown in FIG. 4A, in the vicinity of a portion of the inner surface of the front tube shroud 33 proximate to to the site where the covering extension 33b has been formed, a reinforcement plate 64 is rigidly secured thereto by means of, for example, welding. The reinforcement plate 64 is not essential in the practice of the present invention and may therefore be dispensed with.

Figure 5:
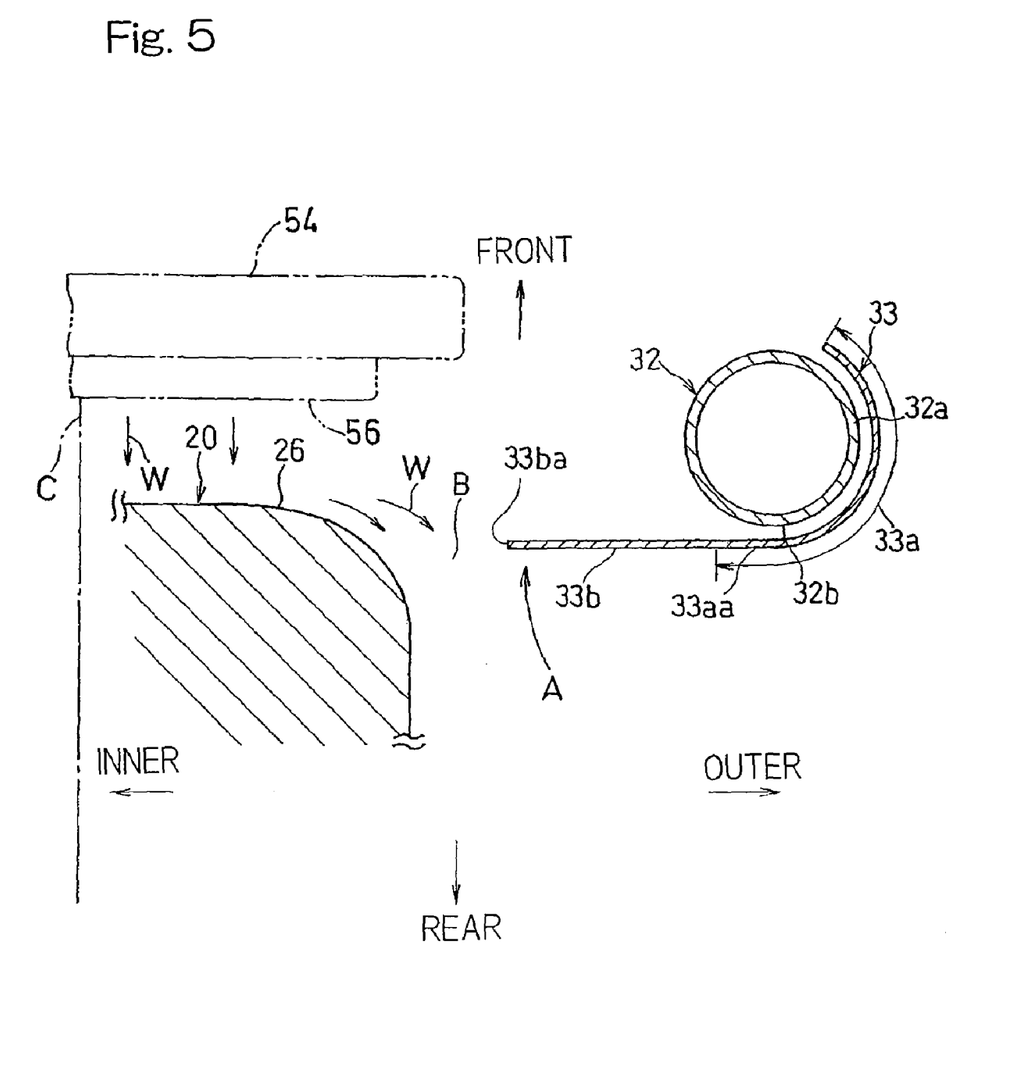
FIG. 5 is a fragmentary sectional view, showing a portion of the exhaust tube covering.

Referring now to FIG. 5, the covering body 33a of the front tube shroud 33 has a sectional shape representing a semicircular shape sufficient to cover an outer side surface 32a and a rear side surface 32b of the front exhaust tube 32 having a substantially round shape in section, and the covering extension 33b is preferably so designed as to extend from an inner end 33aa of the covering body 33a in a direction laterally inwardly of the motorcycle body structure and preferably in a direction perpendicular to the longitudinal mid-center line C of the motorcycle. In order to avoid a contact, a gap B may be defined between a free end 33ba of the covering extension 33b, that is, one of the opposite ends of the covering extension 33a remote from the exhaust tube 32, and the cylinder block 26.

Figure 6:
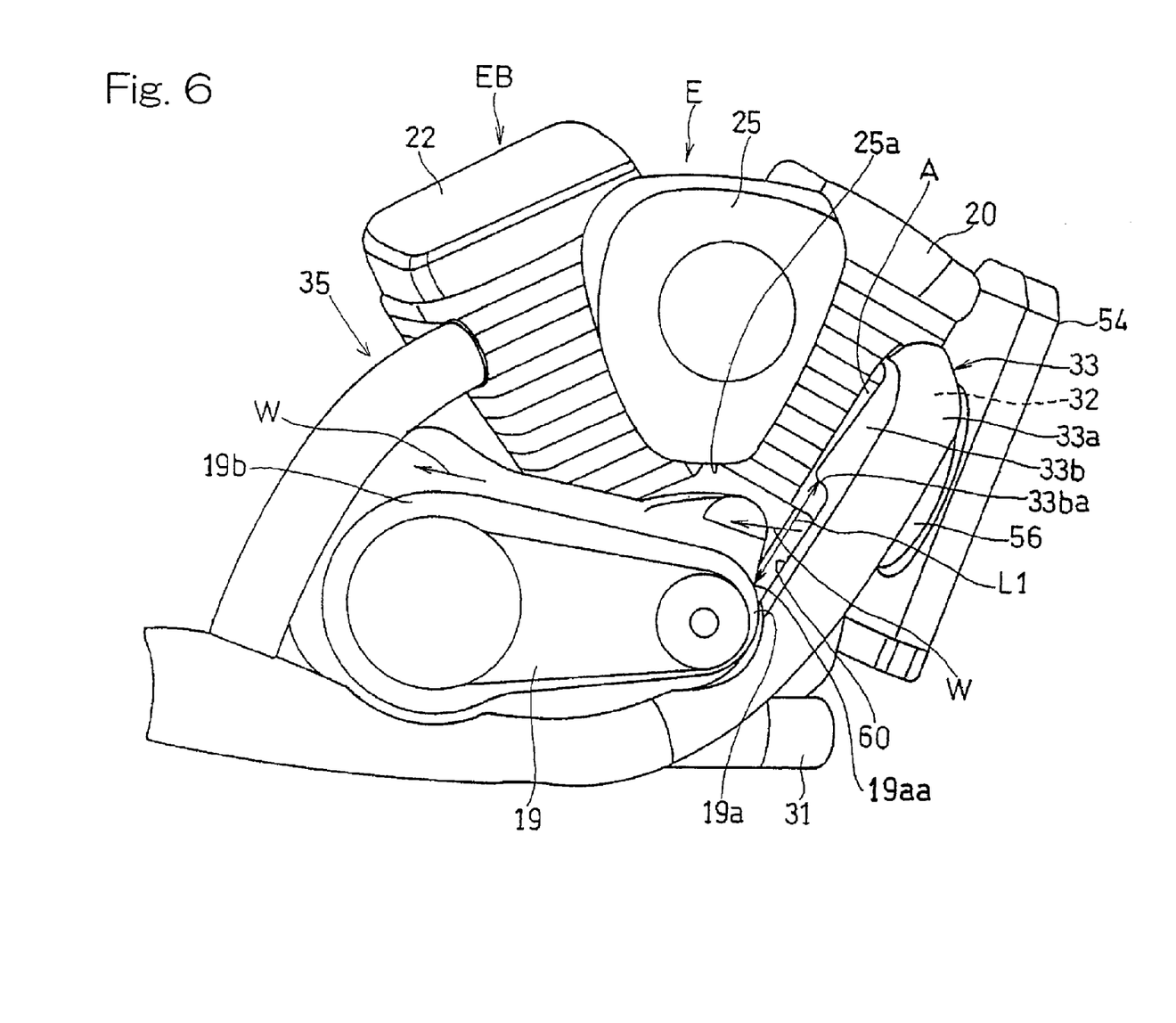
FIG. 6 is a fragmentary side view, showing the motorcycle combustion engine and its surroundings.

Referring now to FIG. 6, an upper end of the opening 60, that is, a lower end portion of the covering extension 33b, is positioned above a front portion of the casing shroud 19. An upper surface area 19aa of the front portion 19a of the casing shroud 19, which defines a lower end portion of the opening 60, is formed at a location below a lower end portion 25a of the air cleaner shroud 25. Accordingly, a stream of hot air W flowing across the radiator 54 into the side space A can be discharged rearwardly after having past an area between the front end portion 19a of the casing shroud 19 and the lower end portion 25a of the air cleaner shroud 25, which lies between the rider's leg and the engine body EB, without being disturbed by the casing shroud 19 and the air cleaner shroud 25. The gap defining the opening 60 is so sized that the longitudinal dimension L1 thereof as measured in a direction conforming to the lengthwise direction of the covering body 33a, that is, in a direction axially of the front exhaust tube 32 may be within the range of about 100 to 200 mm and the transverse dimension L2 (FIG. 2) thereof as measured in a direction widthwise of the motorcycle body structure may be within the range of about 50 to 150 mm.

It is to be noted that the lower end portion 33ba of the covering extension 33b is desirably positioned above at least the front portion 19a thereof whereas the rear portion 19b of the casing shroud 19 may be positioned above the lower end portion 33ba of the covering extension 33b. Even in such case, the stream of hot air W can be smoothly guided in the rearward direction past an area above the front portion 19a of the casing shroud 19.

In the construction described hereinabove, a major portion of the hot air stream W across the radiator 54 shown in FIG. 5 flows towards the side space A on the right side, which is opposite to the direction in which the front cylinder unit 20 is displaced, after having impinged upon a front surface of the front cylinder unit 20. However, since the provision has been made of the covering extension 33b so as to close this side space A, it is possible to prevent the hot air stream W across the radiator 54 from impinging upon the motorcycle rider. Moreover, since the covering extension 33b is provided in the exhaust tube covering body 33a, the number of component parts employed does not increase.

Also as shown in FIG. 6, since the opening 60 is defined between the lower end portion 33ba of the covering extension 33b and the engine body EB, the hot air stream W blocked by the covering extension 33b can be guided in a direction rearwardly of the motorcycle body structure through the opening 60. Therefore, the hot air can be discharged in a direction rearwardly of the motorcycle body structure while not only can impingement of the hot air W upon the rider be avoided, but stagnation of the hot air W within the side space A can also be avoided.

Yet, since the opening 60 is defined at a location above the casing shroud 19 and below the air cleaner shroud 25, the hot air stream W across the radiator 54 can be guided in a rearward direction past an area above the casing shroud 19 protruding laterally, and below the air cleaner shroud 25 protruding laterally, without being disturbed by the casing shroud 19 and the air cleaner shroud 25.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, in the foregoing description concerning the preferred embodiment of the present invention, the opening 6, which is in the form of the gap for discharging the hot air rearwardly therethrough, has been shown and described as defined at the location between the lower end portion 33ba of the covering extension 33b and the engine body EB. However, the gap between the front cylinder unit 20 and the front exhaust tube 32 may be closed completely by the covering extension 33b with a throughhole defined in the covering extension 33b for discharging the hot air in the rearward direction.

Accordingly, such changes and modifications are, unless they depart from the scope of the present invention as delivered from the claims annexed hereto, to be construed as included therein.

REFERENCE NUMERALS

19: Casing shroud
25: Air cleaner shroud
20: Front cylinder unit
22: Rear cylinder unit
32: Front exhaust tube
32a: Upstream tube portion
32b: Descending tube portion
33: Front tube shroud (Covering)
33a: Covering body
33b: Covering extension
34: Rear exhaust tube
54: Radiator
60: Opening (Gap)
A: Side space
C: Longitudinal mid-center line E: Combustion engine
EB: Engine body
W: Heated air stream

What is claimed is:

1. A covering for a motorcycle exhaust tube employed in a V-banked combustion engine having a drive output shaft, extending in a direction widthwise of a motorcycle body structure, and a plurality of cylinder units arranged one after another in a direction longitudinally thereof, the cylinder units including front and rear cylinder units, the front cylinder unit being displaced in one sidewise direction relative to a longitudinal mid-center line of the motorcycle body structure, which covering comprises:

a covering body for covering a front exhaust tube which is drawn from the front cylinder unit in a direction opposite to the one sidewise direction with a side space defined between the front exhaust tube and the front cylinder unit and extends rearwardly downwardly; and a covering extension provided in an upper portion of the covering body and positioned rearwardly of a radiator so as to extend from the covering body with a step portion towards the front cylinder unit in a direction laterally inwardly of the motorcycle body structure and beyond an inner side edge of the covering body to enter the side space and define an opening extending downward below an air cleaner shroud wherein an air flow from the radiator is blocked by the covering body and the covering body extension from contacting the user's leg, while permitting the air flow to pass through the opening at a position away from contact with the user's leg.

2. The covering for a motorcycle exhaust tube as claimed in claim 1, in which the covering extension closes the side space delimited between the front exhaust tube and the front cylinder unit.

3. The covering for a motorcycle exhaust tube as claimed in claim 2, in which the covering extension has an opening defined therein.

4. The covering for a motorcycle exhaust tube as claimed in claim 3, in which the opening is in the form of a gap defined between a lower end portion of the covering extension and a body of the combustion engine.

5. The covering for a motorcycle exhaust tube as claimed in claim 3, further comprising a casing shroud, fitted to a body of the combustion engine so as to protrude laterally outwardly from the front cylinder units and in which an upper end of the opening is defined in the covering extension at a location above at least a front portion of the casing shroud.

6. The covering for a motorcycle exhaust tube as claimed in claim 3, further comprising an air cleaner shroud fitted to a body of the combustion engine and positioned intermediate between the front and rear cylinder units so as to protrude laterally outwardly from the front and rear cylinder units and in which the opening has a lower end portion positioned below the air cleaner shroud.

7. The covering for a motorcycle exhaust tube as claimed in claim 1, in which the front exhaust tube comprises an upstream portion, drawn in the one sidewise direction and bent to extend rearwardly downwardly, and a descending portion continued from the upstream portion so as to extend rearwardly downwardly and in which the covering extension is formed in an upper portion of the covering body so as to close the side space below the upstream portion of the front exhaust tube.

8. The covering for a motorcycle exhaust tube as claimed in claim 1, in which the combustion engine is a two cylinder combustion engine including the front cylinder unit and the rear cylinder unit, the front cylinder unit being displaced leftwards relative to a longitudinal mid-center line of the motorcycle body structure while the rear cylinder unit being displaced rightwards relative thereto.

9. The covering for a motorcycle exhaust tube as claimed in claim 1, in which the covering extension is positioned rearwardly of a radiator fan.

10. In a covering for a motorcycle exhaust tube employed in a V-banked combustion engine having a drive output shaft, extending in a direction widthwise of a motorcycle body structure, a radiator, an air cleaner shroud and a plurality of cylinder units arranged one after another in a direction longitudinally thereof, the cylinder units including front and rear cylinder units, the front cylinder unit being displaced in one sidewise direction relative to a longitudinal mid-center line of the motorcycle body structure, the radiator is positioned longitudinally in front of the front cylinder unit and the air cleaner shroud is positioned on one side of the front and rear cylinder units above the motorcycle exhaust tube, the improvement comprising:

a covering body having a cross section complementary in shape to cover an outer surface and a rear side surface of an exhaust tube connected to the front cylinder unit, the covering body extends along a side of the front cylinder unit and subsequently down the side of the front cylinder unit, a perimeter of the covering body adjacent the front cylinder unit has a step configuration, in a translation of the covering body to a covering body extension, to define an opening below the covering body extension positioned behind the radiator and extending downward below the air cleaner shroud, wherein an air flow from the radiator is blocked by respectively, the covering body and the covering body extension and passes through the opening in the covering body exterior.

* * * * *